(12) United States Patent
Draznin et al.

(10) Patent No.: US 10,469,551 B2
(45) Date of Patent: Nov. 5, 2019

(54) REDISTRIBUTING BROADCASTED CONTENT

(71) Applicant: Verizon Patent and Licensing Inc., Arlington, VA (US)

(72) Inventors: Sagiv Draznin, Walnut Creek, CA (US); Matthew W. Nelson, Pleasanton, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 94 days.

(21) Appl. No.: 15/649,238

(22) Filed: Jul. 13, 2017

(65) Prior Publication Data

US 2017/0310721 A1 Oct. 26, 2017

Related U.S. Application Data

(62) Division of application No. 14/137,570, filed on Dec. 20, 2013, now Pat. No. 9,781,180.

(51) Int. Cl.
*H04L 29/06* (2006.01)

(52) U.S. Cl.
CPC .............................. *H04L 65/4076* (2013.01)

(58) Field of Classification Search
None
See application file for complete search history.

(56) References Cited

U.S. PATENT DOCUMENTS

| 9,516,105 | B1* | 12/2016 | Roseman | H04N 21/2181 |
|---|---|---|---|---|
| 2001/0017853 | A1 | 8/2001 | Kikuchi et al. | |
| 2004/0131026 | A1* | 7/2004 | Kim | H04W 4/06 370/328 |
| 2007/0243821 | A1* | 10/2007 | Hundscheidt | H04L 29/06 455/3.04 |
| 2009/0249409 | A1* | 10/2009 | Bhogal | H04N 7/17318 725/86 |
| 2010/0023987 | A1* | 1/2010 | Bugenhagen | G06Q 30/02 725/110 |
| 2010/0333161 | A1* | 12/2010 | Chen | H04N 7/17318 725/120 |
| 2011/0238791 | A1* | 9/2011 | Nadeau | H04L 12/2801 709/219 |
| 2012/0113885 | A1* | 5/2012 | Cai | H04W 72/005 370/312 |
| 2012/0209952 | A1* | 8/2012 | Lotfallah | H04L 65/4084 709/217 |
| 2012/0230651 | A1* | 9/2012 | Chen | H04N 5/44543 386/231 |
| 2013/0115872 | A1* | 5/2013 | Huang | H04W 4/02 455/3.01 |

(Continued)

*Primary Examiner* — Chirag G Shah
*Assistant Examiner* — Amar Persaud

(57) ABSTRACT

A server device may receive content that was transmitted using a broadcast technique; track a quantity of user devices that have entered a particular area after the content has been received by the server device; determine, based on the tracking, that the quantity of user devices meets or exceeds a threshold quantity; and redistributing, by the server device and based on the determining, the content to one or more of the user devices that have entered the particular area after the content has been received by the server device.

20 Claims, 15 Drawing Sheets

(56) References Cited

U.S. PATENT DOCUMENTS

| | | | | |
|---|---|---|---|---|
| 2013/0203377 A1* | 8/2013 | Nagata | .............. | H04W 64/00 |
| | | | | 455/405 |
| 2014/0133318 A1* | 5/2014 | Kuehner | .............. | H04W 4/023 |
| | | | | 370/252 |
| 2014/0195353 A1* | 7/2014 | Govan | .............. | G06Q 30/0267 |
| | | | | 705/14.64 |
| 2014/0198712 A1* | 7/2014 | Howard | .............. | H04W 84/047 |
| | | | | 370/312 |
| 2014/0215087 A1* | 7/2014 | Zhao | .............. | H04L 61/2007 |
| | | | | 709/231 |
| 2014/0230000 A1* | 8/2014 | Kotecha | .............. | H04L 65/4084 |
| | | | | 725/98 |
| 2014/0269437 A1* | 9/2014 | Kotecha | .............. | H04W 4/06 |
| | | | | 370/259 |
| 2014/0298372 A1* | 10/2014 | Chen | .............. | H04N 5/76 |
| | | | | 725/27 |
| 2014/0364152 A1* | 12/2014 | Taylor | .............. | H04W 4/02 |
| | | | | 455/456.3 |
| 2015/0049762 A1* | 2/2015 | Mantin | .............. | H04L 65/4076 |
| | | | | 370/390 |
| 2015/0120455 A1* | 4/2015 | McDevitt | .............. | G06Q 30/0261 |
| | | | | 705/14.58 |
| 2015/0208209 A1* | 7/2015 | Jamadagni | .............. | H04W 4/06 |
| | | | | 370/312 |
| 2015/0222678 A1* | 8/2015 | Zhang | .............. | H04L 65/4076 |
| | | | | 709/219 |

* cited by examiner

REDISTRIBUTING BROADCASTED CONTENT

CROSS-REFERENCE TO RELATED APPLICATION

This application is a Divisional of, and claims the benefit of priority of, U.S. patent application Ser. No. 14/137,570, filed Dec. 20, 2013, titled "REDISTRIBUTING BROADCASTED CONTENT," published as U.S. Patent Application Publication No. 2015/0180922, the contents of which are incorporated by reference as though set forth herein.

BACKGROUND

Content providers may broadcast content, such as video content, to a set of devices. For example, a wireless provider may broadcast content to a set of wireless telephones using a Multimedia Broadcast Multicast Service ("MBMS") technique. In some situations, a device may not be reachable (e.g., may be out of range of a base station of a wireless network), and may thus not receive broadcasted content.

DETAILED DESCRIPTION OF PREFERRED EMBODIMENTS

The following detailed description refers to the accompanying drawings. The same reference numbers in different drawings may identify the same or similar elements.

Figure 1:
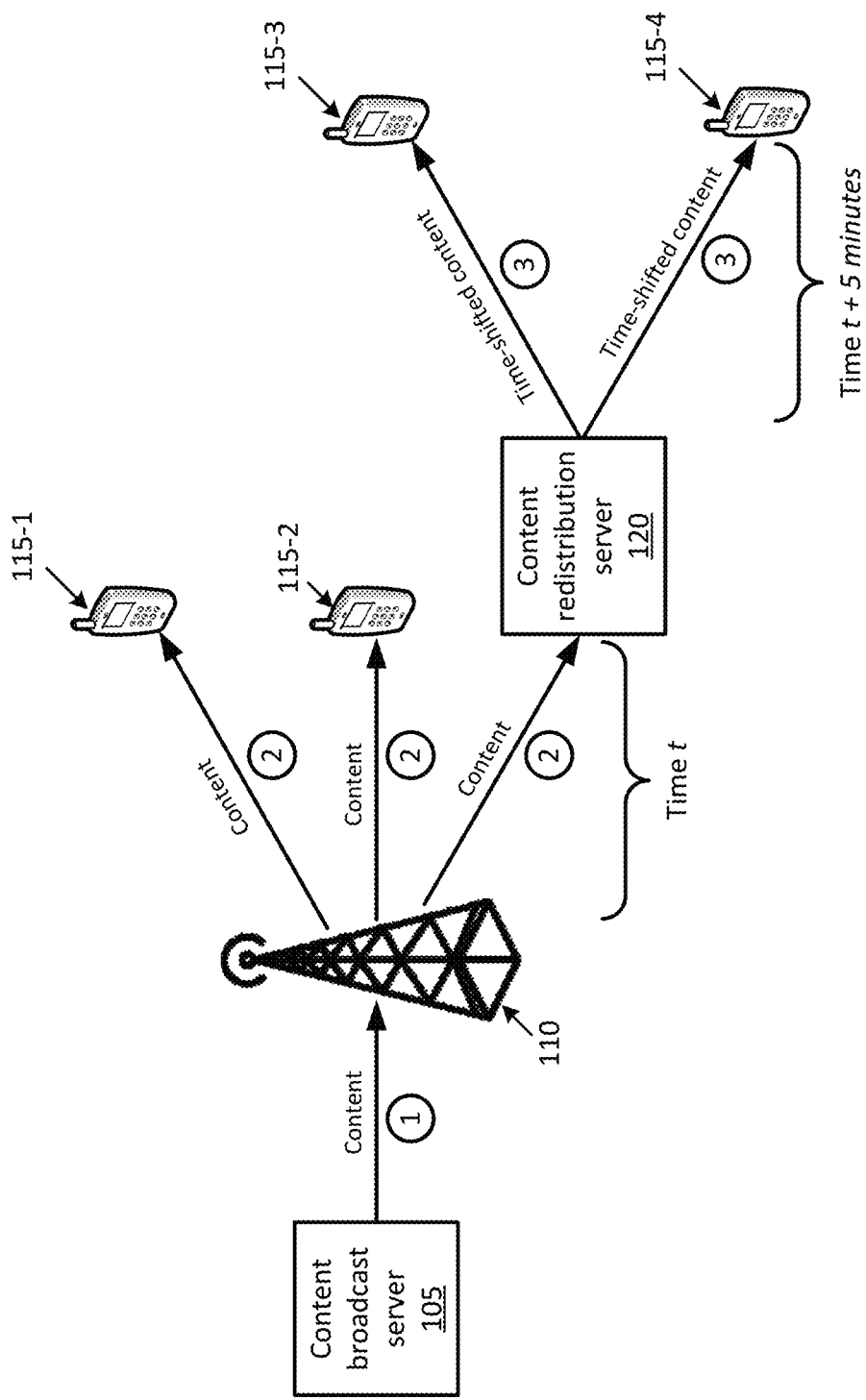
FIGS. 1 and 2 illustrate an example overview of one or more implementations described herein.

Techniques described herein may allow for the redistribution of content, such as content that was originally distributed using a broadcast technique (e.g., content that was broadcasted using an MBMS or an evolved MBMS ("eMBMS") technique). For example, as shown in FIG. 1, content broadcast server 105, in conjunction with base station 110, may broadcast content (e.g., video content, such as movies or television shows) towards user devices 115-1 and 115-2 and content redistribution server 120. For example, content broadcast server 105 may output (at the arrow marked "1") the content to base station 110, which may be a base station of a cellular telecommunications network. Base station 110 may broadcast (at the arrows marked "2") the programming content to user devices 115-1 and 115-2 and content redistribution server 120. As shown in FIG. 1, the broadcasting, by base station 110, may be performed at a particular time ("Time t").

At a later time (e.g., 5 minutes later than time t, shown in the figure as "Time t+5 minutes"), content redistribution server 120 may redistribute the broadcasted content received from base station 110. For example, content redistribution server 120 may broadcast (at the arrows marked "3") time-shifted content to user devices 115-3 and 115-4. The content, broadcasted by content redistribution server 120, may be "time-shifted," in that the content may be presented to user devices 115-3 and 115-4 as originally presented at Time t.

The technique shown in FIG. 1 may be beneficial in a situation where user devices 115-3 and 115-4 are unable to receive the broadcasted content from base station 110. For instance, such a situation may occur when user devices 115-3 and 115-4 are out of range of base station 110 when base station 110 broadcasts the content, when user devices 115-3 and 115-4 use a different wireless technology than base station 110, or for other reasons. Since the content, broadcasted by content redistribution server 120, is time-shifted content, user devices 115-3 and 115-4 may receive the content without losing any of the content (e.g., without losing the five minutes of content between Time t and Time t+5 minutes).

For example, assume that user devices 115 are mobile telephones of attendees of a football game, and that the content includes a live video feed of game-related content, such as highlights from the game or updates from other football games. Further assume that user devices 115-1 and 115-2 are in the football stadium at the time that the feed begins (e.g., at Time t), while user devices 115-3 and 115-4 are not in the football stadium at that time. As shown in the figure, user devices 115-3 and 115-4 may arrive at the football stadium up to five minutes later, and may receive the video feed from the beginning of the feed, as originally broadcasted at Time t. Users of user devices 115-3 and 115-4 may thus be able to view all of the feed, without having missed the first five minutes of the feed.

Figure 2:
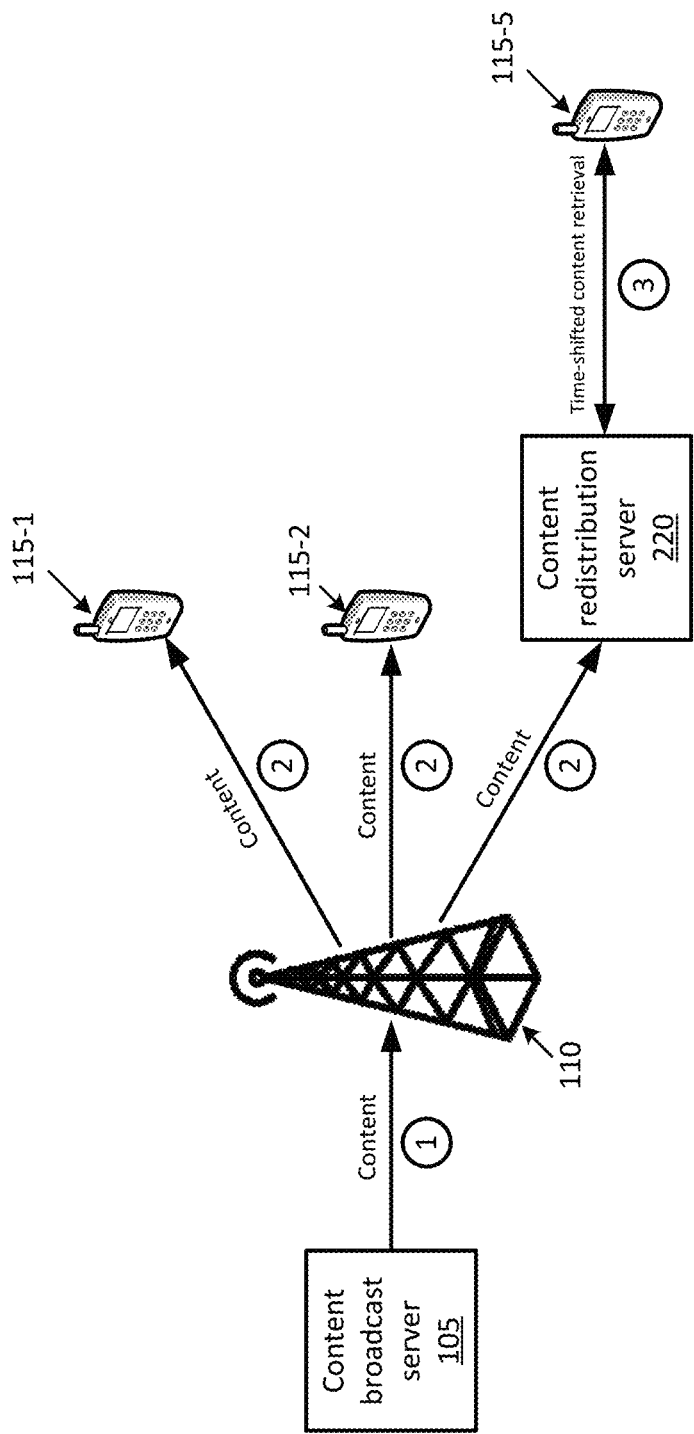

FIG. 2 illustrates an overview of another example implementation. As similarly described in FIG. 1, content broadcast server 105 may output content to base station 110 (at the arrow marked "1"), and base station 110 may broadcast the content to user devices 115-1 and 115-2 and content redistribution server 220 (at the arrows marked "2"). User device 115-5 may, at a later time, request the content from content redistribution server 220. Content redistribution server 220 may provide the content in a time-shifted manner to user device 115-5 (at the arrow marked "3"). In this sense, content redistribution server 220 may act as a "kiosk" for content, which may be provided on-demand to user devices that request the content. By acting as a kiosk for content, content may be made available to user devices that did not, or were not able to, receive the content from base station 110.

Figure 3:
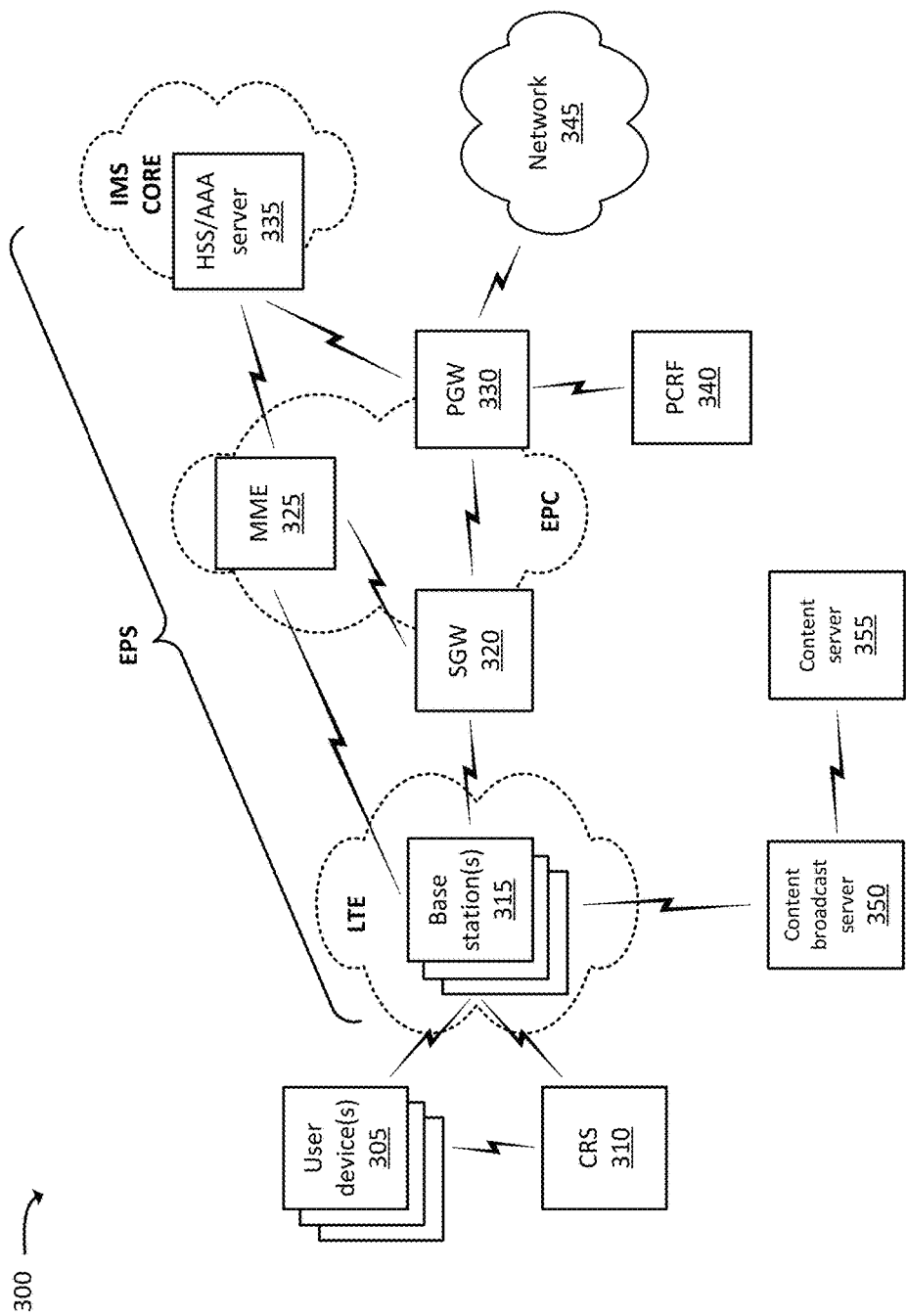
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include one or more user devices 305, content redistribution server ("CRS") 310, one or more base stations 315, serving gateway ("SGW") 320, mobility management entity device ("MME") 325, packet data network ("PDN") gateway ("PGW") 330, home subscriber server ("HSS")/authentication, authorization, accounting ("AAA") server (hereinafter referred to as "HSS/AAA server") 335, policy charging and rules function ("PCRF") 340, network 345, content broadcast server 350, and content server 355.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections. The connections shown in FIG. 3 are example connections; in some implementations, devices in environment 300 may communicate with other devices in environment 300 even where a connection is not shown in FIG. 3.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 315, some or all of which may take the form of an eNodeB ("eNB"), via which user device 305 may communicate with the EPC network. The EPC network may include one or more SGWs 320, MMES 325, and/or PGWs 330, and may enable user device 305 to communicate with network 345 and/or an Internet protocol ("IP") multimedia subsystem ("IMS") core network. The IMS core network may include HSS/AAA server 335, and may manage authentication, session initiation, account information, a user profile, etc. associated with user device 305.

User device 305 may include any computation and communication device, such as a wireless mobile communication device that is capable of communicating with one or more networks (e.g., network 345 and/or the IMS core). For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD"), a personal gaming system, and/or another type of mobile computation and communication device.

CRS 310 may include one or more server devices that redistribute content, such as content received from content broadcast server 350. CRS 310 may include a communication interface, such as a wired or wireless interface, via which CRS 310 may communicate with user device 305 and with base station 315. The functionality of CRS 310, according to some implementations, is described in greater detail below with regard to, for example, FIG. 5. In some implementations, CRS 310 may be, or may be associated with, a physical device with controls that may be actuated by a user (e.g., buttons, a touch screen, or the like). In some such implementations, CRS 310 may be, or may include, a "kiosk" type device, which may be physically located in a location that users may access.

Base station 315 may include one or more network devices that receive, process, and/or transmit traffic, such as calls, audio, video, text, television programming content, and/or other data, destined for and/or received from user device 305 and/or CRS 310. In one example, base station 315 may be an eNB device and may be part of the LTE network. Base station 315 may receive traffic from and/or send traffic to network 345 via SGW 320 and PGW 330. Base station 315 may send traffic to and/or receive traffic from user device 305 and/or CRS 310 via an air interface.

SGW 320 may include one or more network devices that gather, process, search, store, and/or provide information. For example, SGW 320 may include a gateway, a router, a modem, a switch, a firewall, a network interface card ("NIC"), a hub, a bridge, a proxy server, or some other type of device that processes and/or transfers traffic. SGW 320 may, for example, aggregate traffic received from one or more base stations 315 and may send the aggregated traffic to network 345 and/or another network via PGW 330. SGW 320 may also aggregate traffic received from network 345 and/or another network (e.g., via PGW 330) and may send the aggregated traffic to user devices 305 via one or more base stations 315.

MME 325 may include one or more computation and communication devices that gather, process, search, store, and/or provide information. For example, MME 325 may perform operations to register user device 305 with the EPS, to establish bearer channels associated with a session with user device 305, to hand off user device 305 from the EPS to another network, to hand off user device 305 from the other network to the EPS, and/or to perform other operations. MME 325 may perform policing operations on traffic destined for and/or received from user device 305.

PGW 330 may include one or more network devices, or other types of computation and communication devices, that gather, process, search, store, and/or provide information in a manner described herein. For example, PGW 330 may include a gateway, a router, a modem, a switch, a firewall, a NIC, a hub, a bridge, a proxy server, an optical add-drop multiplexer ("OADM"), and/or some other type of device that processes and/or transfers traffic. PGW 330 may aggregate traffic received from one or more SGWs 320, and may send the aggregated traffic to network 345. PGW 330 may also, or alternatively, receive traffic from network 345 and may send the traffic toward user device 305 via SGW 320, and/or base station 315.

HSS/AAA server 335 may include one or more server devices, or other types of devices, that gather, process, search, store, and/or provide information. For example, HSS/AAA server 335 may manage, update, and/or store, in a memory associated with HSS/AAA server 335, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 305 and/or one or more other user devices 305. Additionally, or alternatively, HSS/AAA server 335 may perform authentication, authorization, and/or accounting operations associated with the subscriber and/or a communication session with user device 305.

PCRF 340 may include one or more server devices, or other types of devices, that aggregate information to and from the EPC network and/or other sources. PCRF 340 may receive information regarding policies and/or subscriptions from one or more sources, such as subscriber databases and/or from one or more users (such as, for example, an administrator associated with PCRF 340).

Network 345 may include one or more wired and/or wireless networks. For example, network 345 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 345 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks. In some implementations, some or all of network 345 may be provided by one or more cellular network providers. That is, in some such implementations, network devices within, or associated with, network 345, may be provided by the one or more cellular network providers. In some implementations, network 345 may be communicatively coupled to one or more other networks, such as the Internet.

Content broadcast server 350 may include one or more server devices, which may facilitate in the broadcasting of content to multiple user devices 305. In some implementations, content broadcast server 350 may broadcast programming content, provided by content server 355, via one or more base stations 315. A more detailed example of content broadcast server 350, in accordance with some implementations, is described below with respect to FIG. 4. In some implementations, content broadcast server 350 may implement an MBMS standard, an eMBMS standard, a Cell Broadcast Service ("CBS") standard (e.g., as standardized by the 3GPP), and/or another methodology of broadcasting messages or other content.

Content server 355 may provide content, such as programming content, to content broadcast server 350 for broadcast to user device 305 and/or CRS 310. Content server 355 may be associated with a content provider, such as a television company, an on-demand movie company, and/or another distributor of content. The content may be, for example, programming content, such as television content, movie content, music content, and/or other types of content.

Figure 4:
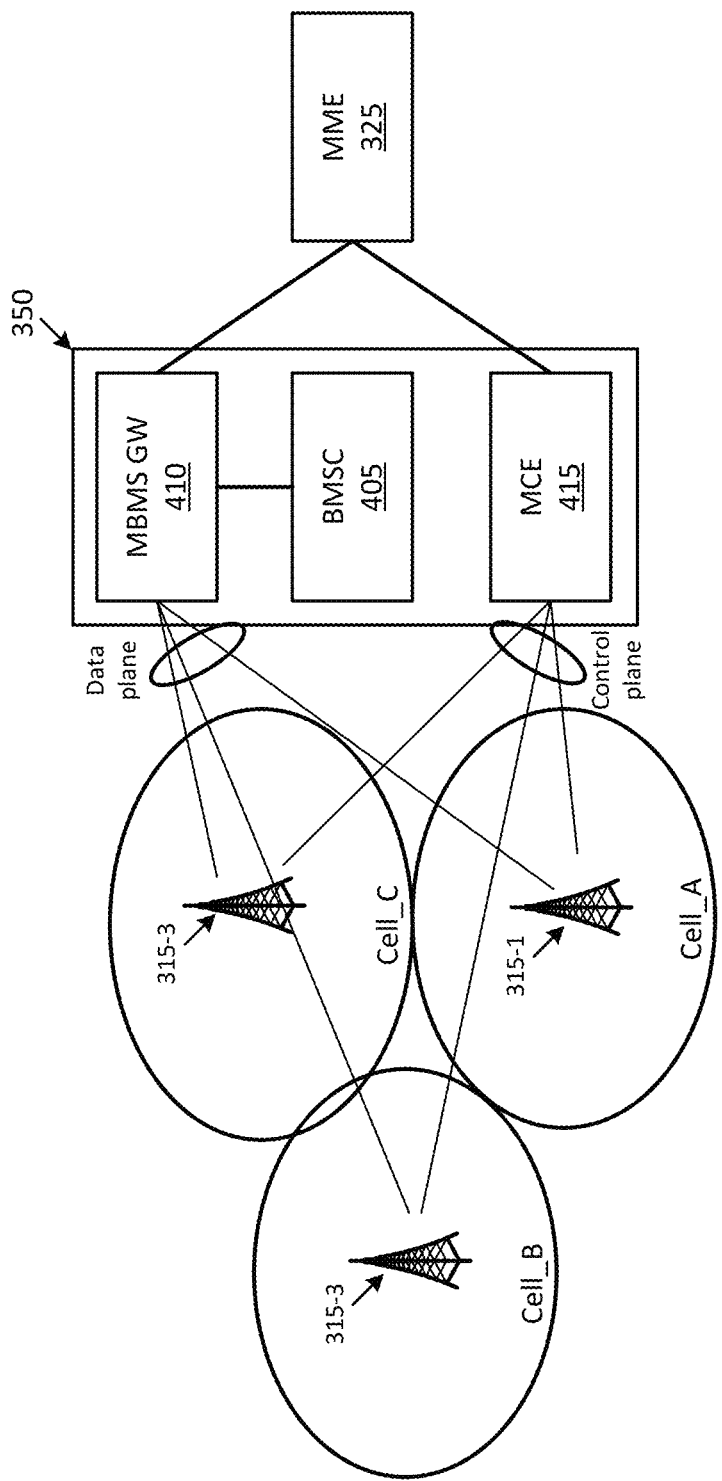
FIG. 4 illustrates an alternate view of some components of an environment in which systems and/or methods, described herein, may be implemented.

FIG. 4 illustrates some components of environment 300 in additional detail. As shown in FIG. 4, content broadcast server 350 may include Broadcast Multicast Service Center ("BMSC") 405, MBMS Gateway ("MBMS GW") 410, and Multi-cell/multicast Coordination Entity ("MCE") 415. In the example shown in FIG. 4, content broadcast server 350 may be in communication with base stations 315-1 through 315-3, each of which may be associated with a respective coverage area, or "cell" (shown in the figure as "Cell_A," "Cell_B," and "Cell_C").

BMSC 405 may include one or more computation or communication devices that provide for the coordination of broadcasting and/or multicasting using MBMS, eMBMS, CBS, and/or another broadcast technique. BMSC 405 may perform functions relating to authorization, charging, and assignment of communication channels. For example, BMSC 405 may assign a particular quantity of broadcast and/or multicast data channels for various content streams. BMSC 405 may also receive content (e.g., programming content from content server 355) for broadcast transmission, and may forward the received content as part of a broadcast or a multicast transmission.

MBMS GW 410 may include one or more computation and communication devices that provide for the coordination of the sending of broadcast and/or multicast data (e.g., IP multicast packets) to base stations 315. MBMS GW 410 may receive the content, which is to be broadcasted and/or multicasted, from BMSC 405. As illustrated, MBMS GW 410 may transmit MBMS data plane traffic to base stations 315.

As mentioned above, MME 325 may perform policing operations on traffic destined for and/or received from user device 305. MME 325 may, in some implementations, aid in the control signaling necessary for messages to be broadcasted and/or multicasted to user devices 305 associated with base stations 315.

MCE 415 may include one or more computation and communication devices that may perform admission control, allocation of radio resources throughout a Multimedia Broadcast Multicast Service Single Frequency Network ("MBSFN") area, MBMS session control signaling, and make decisions on radio configurations. As illustrated, MCE 415 may transmit MBMS control plane traffic to base stations 315.

In eMBMS, cells associated with base stations 315 may be grouped to obtain MBSFN areas. Broadcast and/or multicast data channels in an MBSFN area may be synchronized so that identical broadcast and/or multicast radio signals may be generated, at the same time, for multiple cells. For example, MBSFN areas may be defined that cover the area associated with multiple ones of the illustrated cells. One example MBSFN area may correspond to the area covered by Cell_A and Cell_B. A broadcast and/or multicast data channel, transmitted in the MBSFN area, may include radio signals that are synchronized in Cell_A and Cell_B.

Examples described herein are described in implementations where content is broadcasted to user devices 305. That is, base stations 315 may broadcast content, via broadcast bearers, to user devices 305. In this manner, it is possible that all user devices 305, which are in communication with base stations 315, may receive the content broadcasted from base stations 315. In alternate implementations, one or more base stations 315 may multicast content to multiple user devices 305, without necessarily broadcasting the content to all user devices 305. In multicast implementations, content broadcast server 350 may provide information to base stations 315, indicating which multicast bearers should be associated with which user devices 305.

Figure 5:
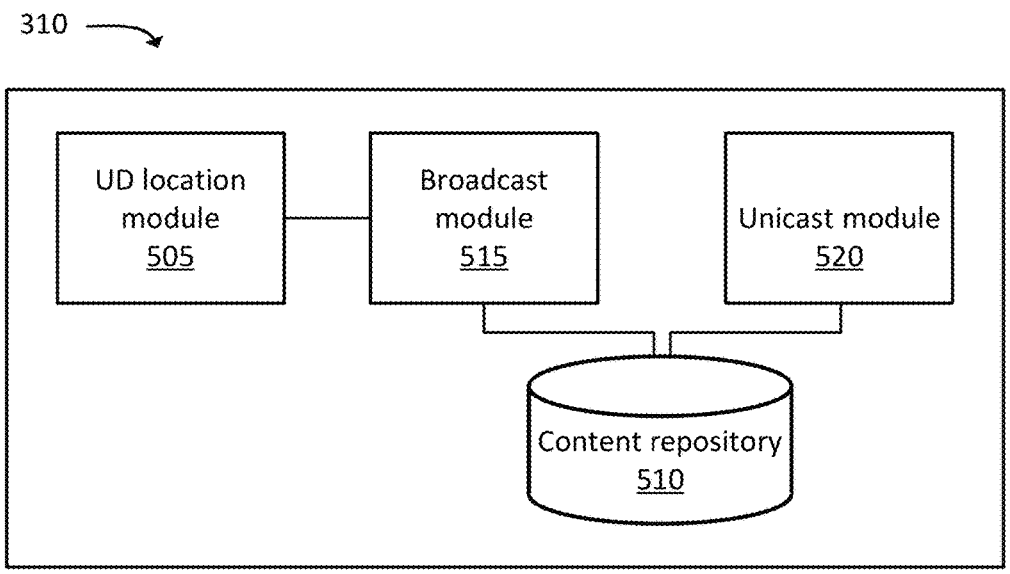
FIG. 5 illustrates example components of a content redistribution server, in accordance with one or more implementations.

FIG. 5 illustrates functional components of an example implementation of CRS 310. As shown, CRS 310 may include user device ("UD") location module 505, content repository 510, broadcast module 515, and unicast module 520. In other implementations, CRS 310 may include fewer, additional, different, and/or differently arranged components. In some implementations, the functionality of one particular component may be performed by one or more other components in addition to, or in lieu of, the particular component.

User device location module 505 may determine, or may receive information regarding, the locations of one or more user devices 305. For example, the location information for a particular user device 305 may include geographic location information, information identifying a cell or access point of a wireless network that is in communication with or in range of the particular user device 305, information indicating whether the particular user device 305 is in range of CRS 310, information identifying whether the particular user device 305 is located within a particular structure, or other types of location information pertaining to the particular user device 305. The location information may be determined (by CRS 310 and/or by another device) using, for example, a cellular triangulation technique. Additionally, or alternatively, the location information, pertaining to a particular user device 305, may be determined by the particular user device 305 (e.g., by using a Global Positioning System ("GPS")-based technique). As described below, CRS 310 may use location information to determine when user devices 305 enter or leave an area associated with redistributing content.

Content repository 510 may store content for redistribution by CRS 310. The content may include, for example, video content, audio content, web content, text content, and/or any other type of content. The content may be received from, for example, content broadcast server 350 (e.g., via base station 315, using a broadcasting technique). In other implementations, some or all of the content may be received from another source.

Broadcast module 515 may redistribute content, stored by content repository 510. For example, broadcast module 515 may rebroadcast content that was received by CRS 310 via a broadcast technique. In some implementations, content repository 510 may periodically rebroadcast content (e.g., every five minutes after receiving the content, every 10 minutes after receiving the content, etc.). In some implementations, content repository 510 may broadcast the content based on determining that a particular quantity of user devices 305 have entered an area associated with CRS 310 within a particular duration of time.

For example, assume that CRS 310 is associated with a football stadium, and is designed to redistribute content when a threshold quantity of user devices 305 have entered the football stadium within a particular period of time (e.g., ten user devices 305 within a rolling ten-minute window, twenty user devices 305 since content was last redistributed, etc.). In this example, broadcast module 515 may use location information, associated with a set of user devices, to identify when the threshold quantity of user devices 305 has entered the stadium. Based on identifying that the threshold quantity of user devices 305 has entered the stadium, broadcast module 515 may redistribute previously received content (e.g., previously received broadcasted content).

When redistributing content (e.g., content stored by content repository 510), broadcast module 515 may mark the content (e.g., add information to the content), which may serve as an identifier of the content. For instance, the identifier may include a hash or another type of information that identifies the content. In some implementations, the identifier may indicate that the content is a redistributed version of content that has already been broadcasted. The identifier may be used by recipients of the redistributed content (e.g., user devices 305), which may discard redistributed versions of content that has already been received by user devices 305. In other implementations, broadcast module 515 may forgo marking the content with such an identifier.

Broadcast module 515 may utilize a broadcast or multicast technique to redistribute the content to user devices 305. For example, broadcast module 515 may output the content via a wireless LAN ("WLAN"), such as a WLAN implemented using "Wi-Fi," using a broadcast protocol. In some such implementations, broadcast module 515 may include, or may be communicatively coupled with, a WLAN router and/or access point that is capable of wirelessly communicating with user devices 305.

In some implementations, broadcast module 515 may output the content to content broadcast server 350, via base station 315. Content broadcast server 350 may cause base station 315 to broadcast the content to user devices 305. In this sense, CRS 310 may act as a content server for content broadcast server 350, in that the content that is broadcasted by content broadcast server 350 is received from CRS 310. Thus, in some such implementations, content may be broadcasted and rebroadcasted by base station 315 (e.g., using MBMS, eMBMS, or the like).

In some implementations, content server 355 (or some other storage device) may retain content that has been broadcasted by content broadcast server 350. In some such implementations, broadcast module 515 may cause content broadcast server 350 to rebroadcast content, which has been previously broadcasted and retained by content server 355. In this sense, broadcast module 515 may act as a trigger for the rebroadcasting by content broadcast server 350, in that broadcast module 515 may determine when a rebroadcast, by content broadcast server 350, should occur.

When rebroadcasting the content, as mentioned above, broadcast module 515 may rebroadcast the content in a time-shifted manner. For example, assume that the content corresponds to live coverage of a sporting event, and is received by CRS 310 starting at 2:00 PM. Content repository 510 may store the received content, and at 2:05 PM, CRS 310 may rebroadcast the stored content (i.e., the content that was received starting at 2:00 PM). In this manner, user devices 305 that were not present for the broadcasted coverage at 2:00 PM may begin receiving the broadcasted coverage at 2:05 PM, thus enhancing the experience for those users who may desire to access the content but did not receive the content at the time of original broadcast.

Unicast module 520 may receive requests for stored content that was received via broadcast, and may output the content in response to the requests. For example, unicast module 520 may present (e.g., by way of a graphical menu) information regarding received broadcasted content. The information may identify the content, may indicate when the content was originally broadcasted (e.g., by content broadcast server 350), and/or may include other information regarding the content. Unicast module 520 may present the information on a display device associated with unicast module 520, and/or may output the information to user device 305, which may graphically present the information to a user.

The user may use the information to select content, which the user desires to access. The user may indicate to unicast module 520 (e.g., by actuating a button associated with unicast module 520, and/or by sending a command from user device 305) which content the user has selected. Based on receiving the selection, unicast module 520 may output the selected content to user device 305. The content may be time-shifted content, as described above. In this manner, CRS 310 may act as a kiosk, which may redistribute broadcasted content on-demand, in a unicast manner.

Figure 6:
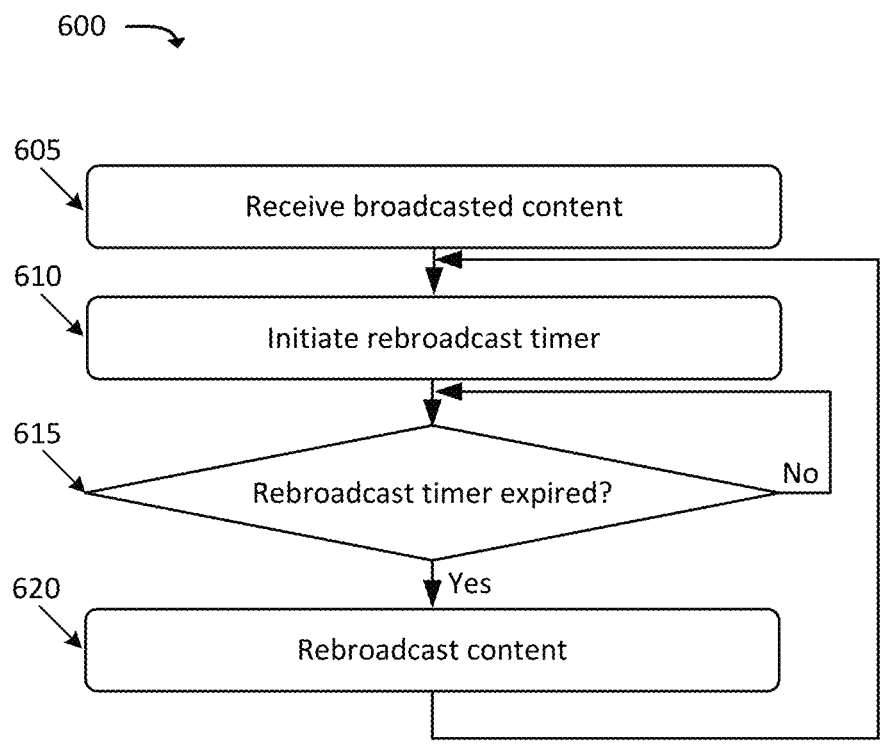
FIG. 6 illustrates an example process for periodically rebroadcasting content.

FIG. 6 illustrates an example process 600 for periodically rebroadcasting content. In one example implementation, process 600 may be performed by CRS 310. In other implementations, some or all of process 600 may be performed by one or more other devices in lieu of, or in conjunction with, CRS 310.

Process 600 may include receiving broadcasted content (block 605). For example, CRS 310 may receive content that has been broadcasted by content broadcast server 350 (e.g., content received from content server 355, and broadcasted via base station 315 using MBMS, eMBMS, or another broadcast technique). As described above with respect to content repository 510, CRS 310 and or content server 355 may store the broadcasted content for later retrieval.

Process 600 may also include initiating a rebroadcast timer (block 610). Broadcast module 515 may use the rebroadcast timer to determine when the content should be rebroadcasted. In some implementations, the rebroadcast timer may be initiated (at block 610) based on receiving the broadcasted content. The rebroadcast timer may be configured by, for example, an administrator associated with CRS 310.

Process 600 may further include determining whether the rebroadcast timer has expired (block 615). For example, while the timer is running and has not expired (block 615—NO), then process 600 may include continuing to run the timer and determine whether the rebroadcast timer has expired (block 615).

If, on the other hand, the rebroadcast timer has expired (block 615—YES), then process 600 may include rebroadcasting the content (block 620). For example, as described above with respect to broadcast module 515, CRS 310 may rebroadcast the content upon the expiration of the rebroadcast timer, thus enabling user devices 305, which did not receive the originally broadcasted content, to receive the content in a time-shifted manner. As shown, in some implementations, process 600 may further include re-initiating the rebroadcast timer (block 610). In this manner, blocks 610-620 may be repeated iteratively, to repeatedly rebroadcast broadcasted content.

Figure 7:
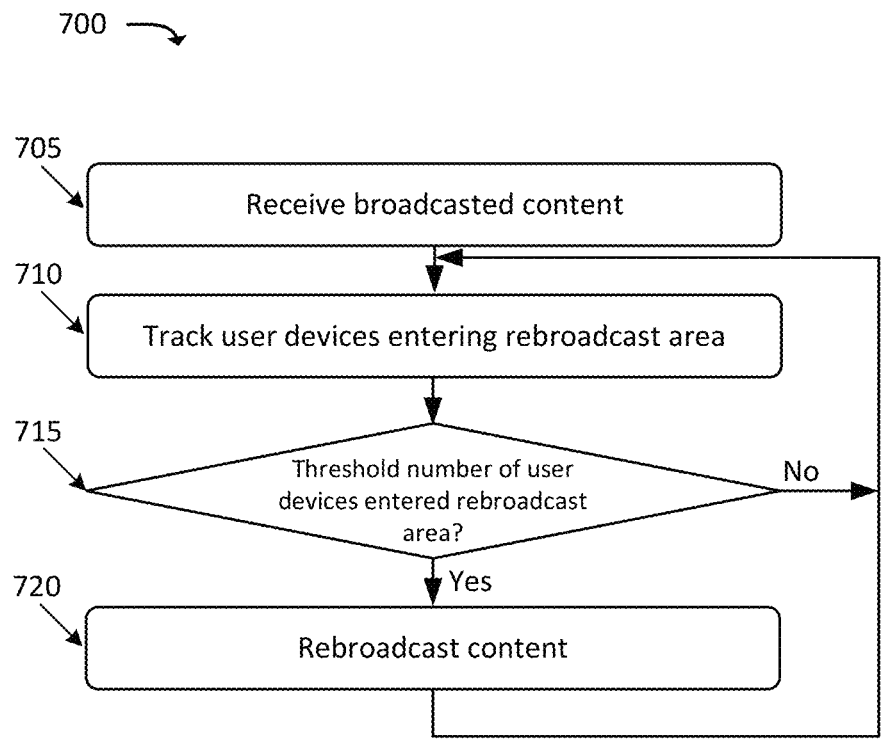
FIG. 7 illustrates an example process for rebroadcasting content based on detecting user devices in a rebroadcast area.

FIG. 7 illustrates an example process 700 for periodically rebroadcasting content. In one example implementation, process 700 may be performed by CRS 310. In other implementations, some or all of process 700 may be performed by one or more other devices in lieu of, or in conjunction with, CRS 310.

Process 700 may include receiving broadcasted content (block 705). For example, CRS 310 may receive content that has been broadcasted by content broadcast server 350 (e.g., content received from content server 355, and broadcasted via base station 315 using MBMS, eMBMS, or another broadcast technique). As described above with respect to content repository 510, CRS 310 and or content server 355 may store the broadcasted content for later retrieval.

Process 700 may also include tracking user devices entering a rebroadcast area (block 710). For instance, as described above with respect to user device location module 505, CRS 310 may determine, or receive information regarding, the locations of one or more user devices 305. For example, CRS 310 may determine when a user device 305 has entered a designated rebroadcast area associated with CRS 310. In some implementations, the broadcast area may be, for example, a structure or other defined region, anywhere within range of a wireless radio transceiver associated with CRS 310, or another defined area. The broadcast area may be defined by, for example, an administrator associated with CRS 310, and/or may be automatically determined by CRS 310.

CRS 310 may, in some implementations, also keep track of which user devices 305, in the rebroadcast area, have received particular rebroadcasted content. In this sense, CRS 310 may keep track of "new" user devices 305, which are possible candidates for receiving rebroadcasted content.

In some implementations, in addition to, or in lieu of, tracking user devices entering a rebroadcast area, CRS 310 may track a number of user devices 305 that request the rebroadcasting of previously broadcasted content. For example, user devices 305 may, for example, receive a notification that content was previously broadcasted, and may output requests for the content that was previously rebroadcasted. As will be described below, CRS 310 may use these requests to determine whether to rebroadcast the comment.

Process 700 may include determining whether a threshold number of user devices have entered the rebroadcast area (block 715). For example, as described above with respect to broadcast module 515, based on the tracking (performed at block 710), CRS 310 may determine when a threshold number of user devices 305 have entered the rebroadcast area. Additionally, or alternatively, CRS 310 may determine whether a threshold number of user devices 305 have requested the rebroadcasting of previously broadcasted content.

In some implementations, instead of determining whether a threshold quantity of "new" user devices 305 (e.g., user devices 305 that have not previously received the content) are present in the rebroadcast area, CRS 310 may keep track of an overall quantity of user devices 305 in the rebroadcast area. If the overall quantity of user devices 305 exceeds a particular number, or if the change in overall quantity since the last rebroadcast exceeds a particular number, then CRS 310 may make a positive determination at block 715.

If the threshold number of user devices have entered the rebroadcast area (block 715—YES), then process 700 may include rebroadcasting the content (block 720). For example, as described above with respect to broadcast module 515, CRS 310 may rebroadcast the content, thus enabling user devices 305, which did not receive the originally broadcasted content, to receive the content in a time-shifted manner.

If, on the other hand, the threshold number of user devices have not entered the rebroadcast area (block 715—NO), then process 700 may include continuing to track the user devices entering the rebroadcast area (block 710). In this manner, CRS 310 may rebroadcast content when the threshold number of user devices have entered the rebroadcast area, and may forgo rebroadcasting the content when the threshold number of user devices have not entered the rebroadcast area.

Figure 8A:
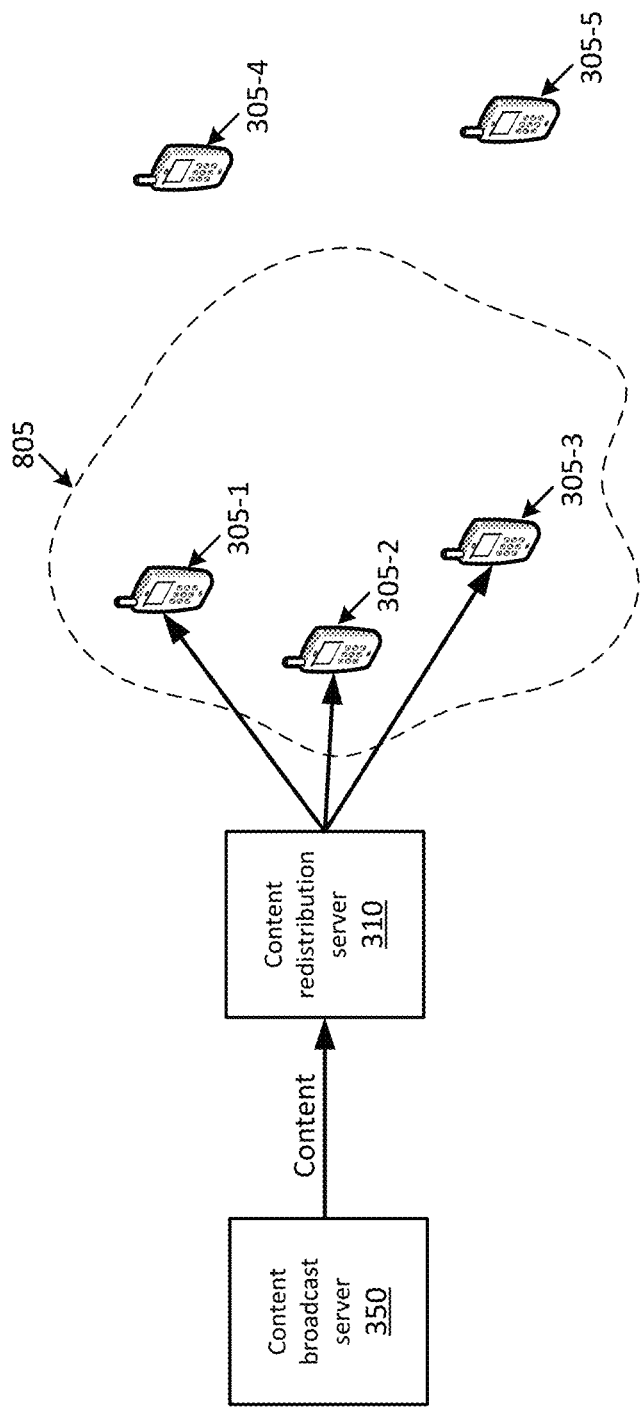
FIGS. 8A-8C illustrate an example of rebroadcasting content based on detecting user devices in a rebroadcast area.
Figure 8B:
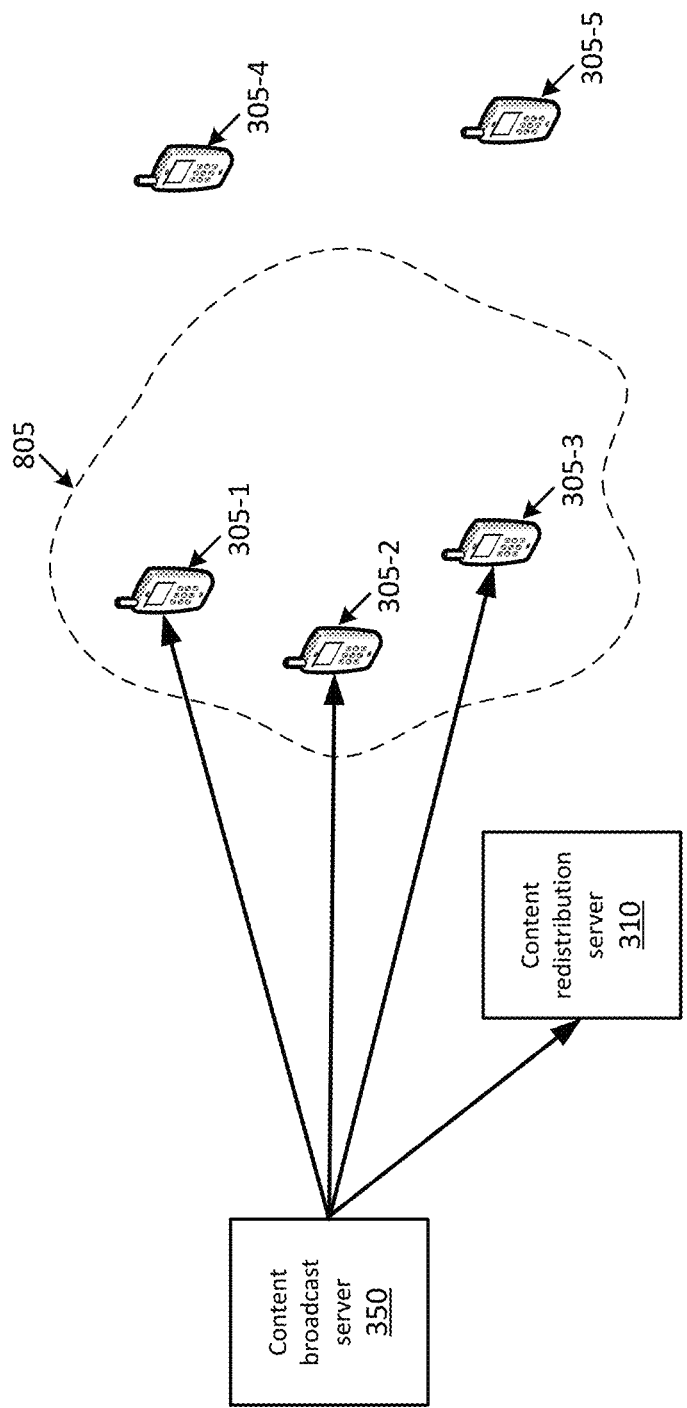
Figure 8C:
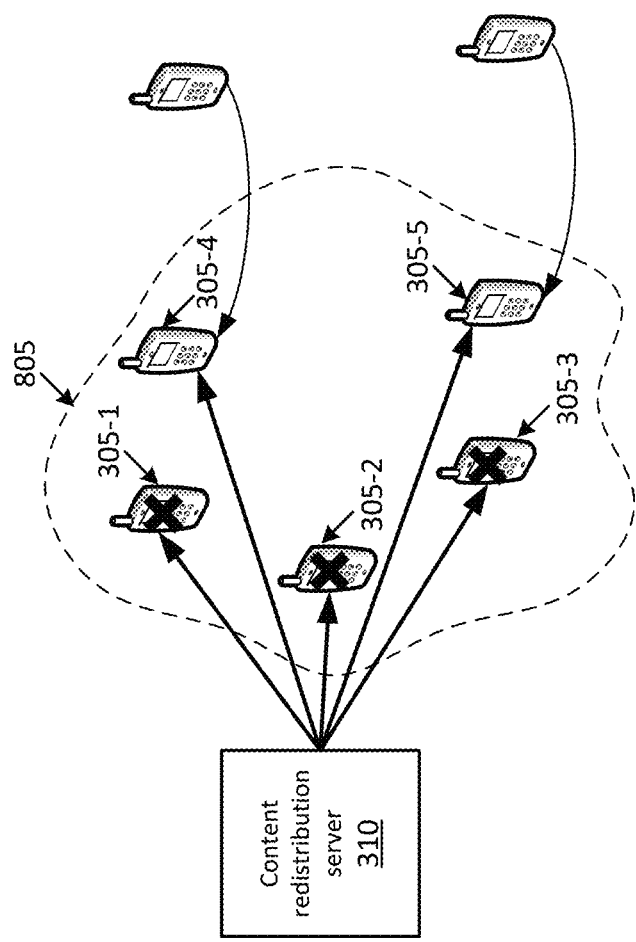

FIGS. 8A-8C illustrate an example of rebroadcasting content based on detecting user devices in a rebroadcast area. As shown in FIG. 8A, user devices 305-1 through 305-3 may be located within rebroadcast area 805, and user devices 305-4 and 305-5 may be located outside of rebroadcast area 805. As also shown, CRS 310 may receive broadcasted content from content broadcast server 350, and may rebroadcast the content. Because user devices 305-1 through 305-3 are within rebroadcast area 805, user devices 305-1 through 305-3 may receive the rebroadcasted content. On the other hand, because user devices 305-4 and 305-5 are not within rebroadcast area 805, user devices 305-4 and 3505— may not receive the rebroadcasted content.

FIG. 8B illustrates another example of user devices 305-1 through 305-3 receiving broadcasted content. In FIG. 8B, instead of receiving rebroadcasted content from CRS 310, user devices 305-1 through 305-3 may receive broadcasted content from content broadcast server 350.

FIG. 8C illustrates an example situation that may occur after the broadcasting and/or rebroadcasting shown in FIG. 8A or FIG. 8B. As shown in FIG. 8C, user devices 305-4 and 305-5 may move into rebroadcast area 805. CRS 310 may use location tracking information to determine that user devices 305-4 and 305-5 are now located within rebroadcast area 805, and may thus determine that two "new" user devices 305 (e.g., user devices 305 that did not previously receive the content) are present. Assume, for this example, that the threshold quantity of user devices 305 is two. Thus, CRS 310 may determine that the threshold quantity of user devices 305 has entered rebroadcast area 805, and the content should be rebroadcasted.

As shown, CRS 310 may rebroadcast the content, and the rebroadcasted content may be received by user devices 305-1 through 305-5. As indicated by the "X" on user devices 305-1 through 305-3, these user devices 305 may discard the rebroadcasted content, as these user devices 305 have previously received the content (either from CRS 310, as shown in FIG. 8A, or from content broadcast server 350, as shown in FIG. 8B). For example, user devices 305-1 through 305-3 may use an identifier in the content to determine that the content has already been received by user devices 305-1 through 305-3.

Figure 9:
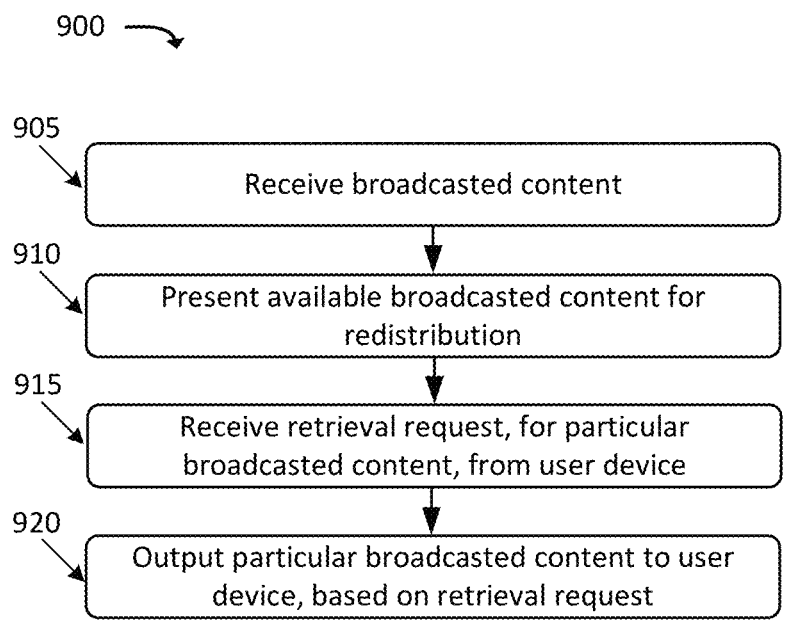
FIG. 9 illustrates an example process for redistributing broadcasted content to a user device based on a request from the user device.

FIG. 9 illustrates an example process 900 for redistributing broadcasted content to a user device based on a request from the user device. In one example implementation, process 900 may be performed by CRS 310. In other implementations, some or all of process 900 may be performed by one or more other devices in lieu of, or in conjunction with, CRS 310.

Process 900 may include receiving broadcasted content (block 905). For example, CRS 310 may receive content that has been broadcasted by content broadcast server 350 (e.g., content received from content server 355, and broadcasted via base station 315 using MBMS, eMBMS, or another broadcast technique). As described above with respect to content repository 510, CRS 310 and or content server 355 may store the broadcasted content for later retrieval.

Process 900 may also include presenting available broadcasted content for redistribution (block 910). For example, CRS 310 may output (e.g., via a display device associated with CRS 310 and/or to a particular user device 305) information identifying the content. The information may include, for example, a name or descriptive information, a thumbnail image, a preview video or audio clip, or other types of information. In a situation where multiple items of content are available, CRS 310 may display a menu that includes options to select one or more of the available items of content.

Process 900 may further include receiving a retrieval request, for particular rebroadcasted content, from a user device (block 915). For example, CRS 310 may receive a request for a particular content item. In some implementations, the retrieval request may be made by a "bump," in which user device 305 physically touches or is in close physical proximity to a sensor associated with CRS 310. The "bump" may be sense by, for example, a Near Field Communication ("NFC") technique, or a similar technique. In some implementations, CRS 310 may include a button or a touch screen, via which the retrieval request may be made. Additionally, or alternatively, CRS 310 may receive the retrieval request via a message transmitted by CRS 310 (e.g., a message transmitted via a WLAN).

Process 900 may additionally include outputting the particular broadcasted content to the user device, based on the retrieval request (block 920). For example, as described above with respect to unicast module 520, CRS 310 may output the requested content to CRS 310. CRS 310 may output the content via, for example, a WLAN, a cellular data network, or using another technique.

Figure 10:
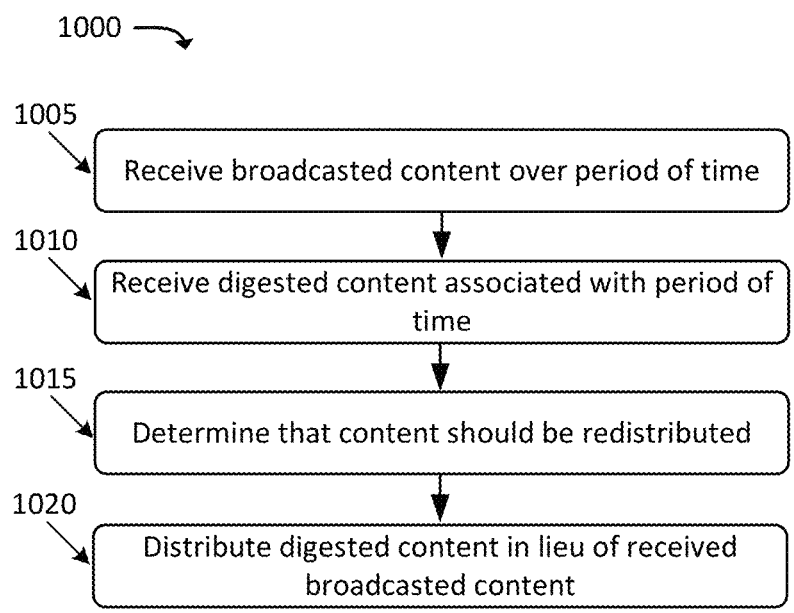
FIG. 10 illustrates an example process for distributing digested content that corresponds to a particular period of time during which content was broadcasted.

FIG. 10 illustrates an example process 1000 for distributing digested content that corresponds to a particular period of time during which content was broadcasted. In one example implementation, process 1000 may be performed by CRS 310. In other implementations, some or all of process 1000 may be performed by one or more other devices in lieu of, or in conjunction with, CRS 310.

Process 1000 may include receiving broadcasted content over a period of time (block 1005). For example, CRS 310 may receive content that has been broadcasted by content broadcast server 350 (e.g., content received from content server 355, and broadcasted via base station 315 using MBMS, eMBMS, or another broadcast technique). As described above with respect to content repository 510, CRS 310 and or content server 355 may store the broadcasted content for later retrieval. The broadcasted content may be received over a period of time. For example, the broadcasted content may include live coverage of a sporting event, and may be received by CRS 310 as the content is broadcasted.

Process 1000 may further include receiving digested content associated with the period of time (block 1010). For example, CRS 310 may receive a "digest" that corresponds to the period of time associated with the received broadcasted content. The digested content may include, for example, highlights or a summary associated with the broadcasted content, and may be shorter in duration than the period of time. For instance, assume that the broadcasted content is live commentary on a football game, and is ten minutes long. The digested content may include, for example, commentary that includes a summary of the ten minutes of the football game, and may be thirty seconds long. The digested content may be received from, for example, an administrator associated with CRS 310, and/or may be automatically generated by CRS 310 or another device.

Process 1000 may also include determining that the content should be redistributed (block 1015). For example, CRS 310 may use one or more of the techniques described in FIG. 6, 7, or 9 (and/or another technique) to determine that the content should be redistributed. For example, CRS 310 may determine that a redistribution timer has expired, or that a threshold quantity of user devices 305 has entered a rebroadcast area associated with CRS 310.

Process 1000 may additionally include distributing the digested content in lieu of the received broadcasted content (block 1020). For example, CRS 310 may determine that since digested content, associated with the broadcasted content, is available, CRS 310 may output the digested content in lieu of the broadcasted content. Outputting the digested content may allow user devices 305 to "catch up" to a live broadcast, which may be desirable from the standpoint of a user.

In some implementations, CRS 310 may present an option, to user device 305, to receive the broadcasted content or the digested content. Presenting the option may allow a user to make a choice as to whether he or she prefers to access the digested content or the full broadcasted content. When distributing (at block 1020) the digested content, CRS 310 may suitably distribute the content via a broadcast or a unicast technique, as described above.

Figure 11:
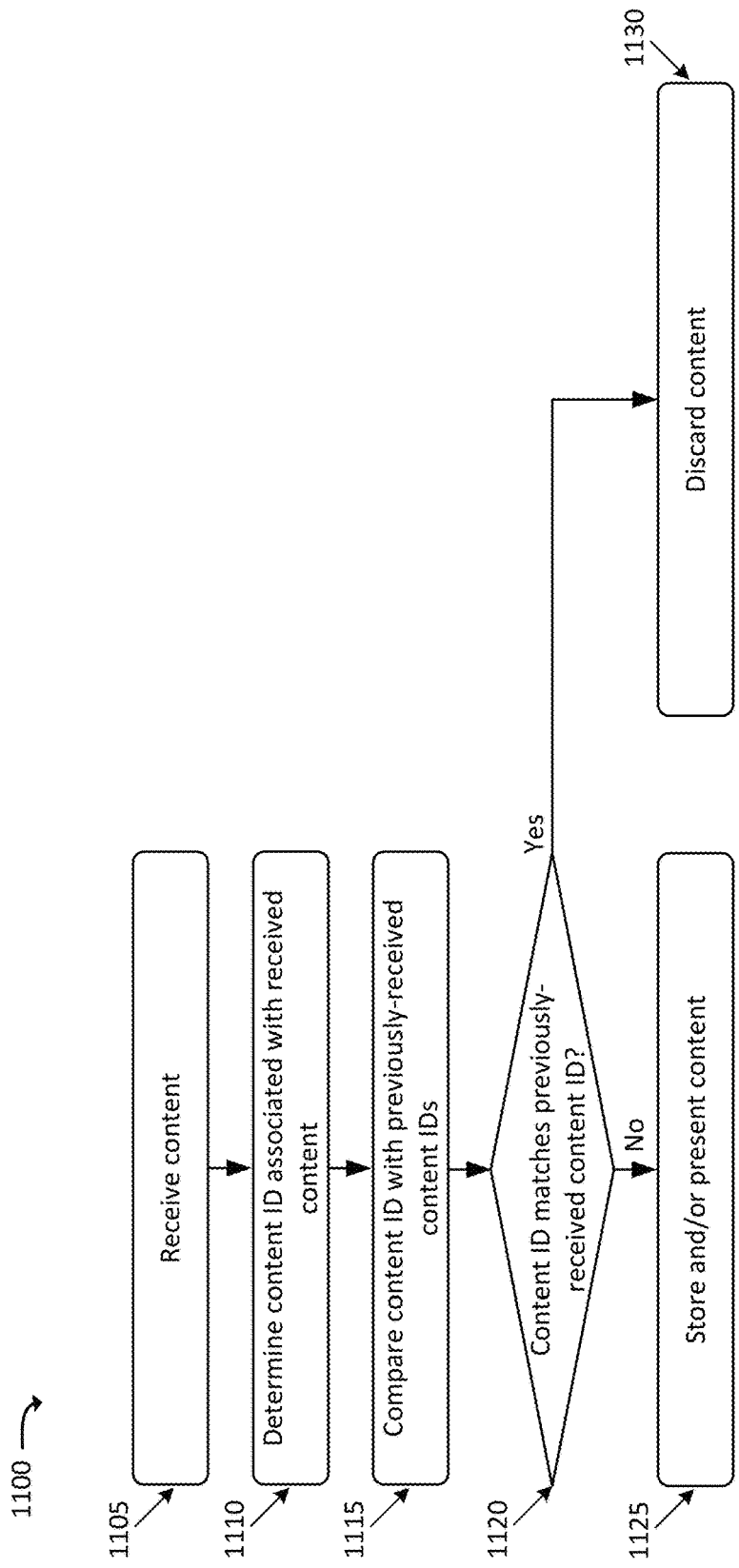
FIG. 11 illustrates an example process for presenting redistributed content at a user device.

FIG. 11 illustrates an example process 1100 for presenting redistributed content at a user device. In one example implementation, process 1000 may be performed by user device 305. In other implementations, some or all of process 1000 may be performed by one or more other devices in lieu of, or in conjunction with, user device 305.

Process 1100 may include receiving content (block 1105). For example, user device 305 may receive content from CRS 310, content broadcast server 350, and/or from another source.

Process 1100 may further include determining a content identifier ("ID") associated with the received content (block 1110). For example, the content may include a content identifier, or user device 305 may generate a content identifier (e.g., a hash of the content or a portion of the content).

Process 1100 may also include comparing the content identifier with content identifiers of previously received content (block 1115). For example, user device 305 may have previously received other content and may store content identifiers associated with the previously-received other content. User device 305 may compare these content identifiers to the content identifier, determined at block 1110.

Process 1100 may include determining whether the content identifier, of the received content, matches a content identifier of previously-received content (block 1120). If the content identifier of the content (received at block 1105) does not match a content identifier of previously-received content (block 1120—NO), then process 1100 may include storing and/or presenting the content (block 1125). For example, user device 305 may visually present the content on a display device associated with user device 305, and/or may store the content, for later presentation, in a memory device associated with user device 305.

If, on the other hand, the content identifier of the content (received at block 1105) matches a content identifier of previously-received content (block 1120—YES), then process 1100 may include discarding the content (block 1130). For example, user device 305 may forgo storing or presenting the content. In some implementations, discarding the content may include forgoing providing the content to an application layer of user device 305.

Figure 12:
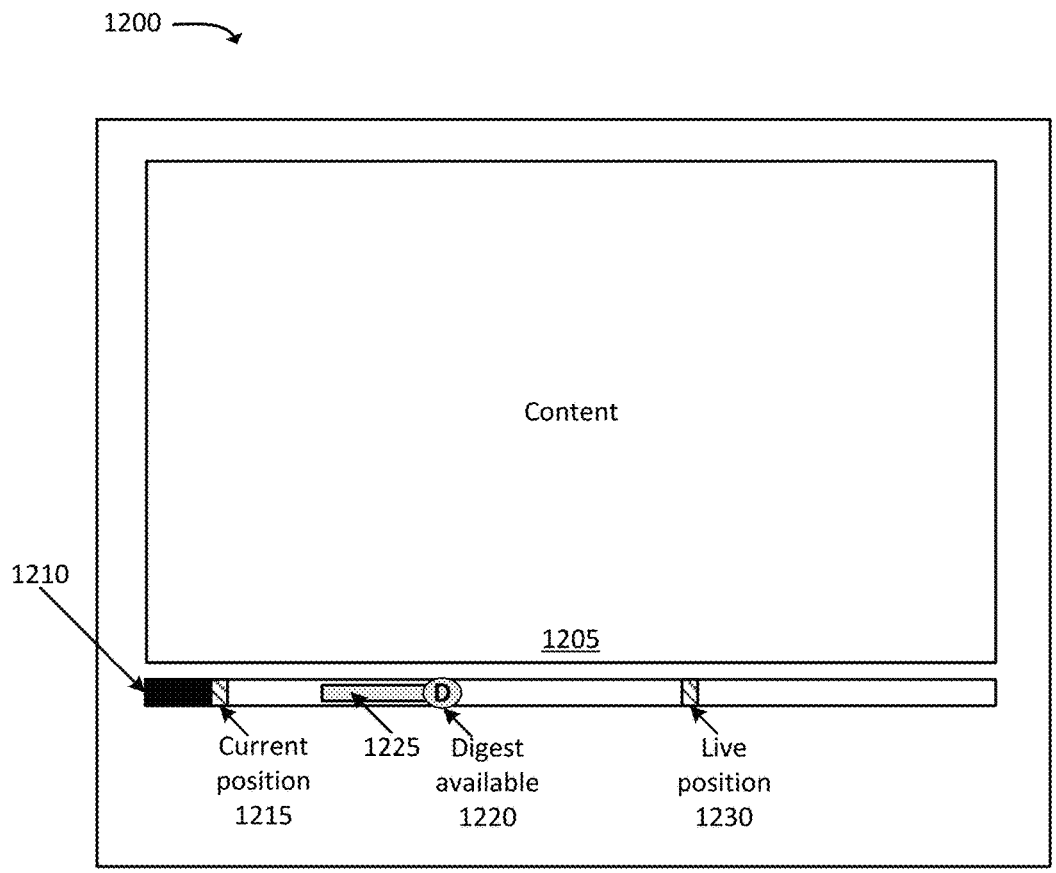
FIG. 12 illustrates an example user interface that may be used for presenting redistributed content at a user device.

FIG. 12 illustrates an example user interface 1200 that may be used for presenting redistributed content at user device 305. As shown, content redistribution server 1200 may include display area 1205 and progress bar 1210. In some implementations, progress bar 1210 may include various components, such as current position indicator 1215, digest duration indicator 1225, digest available indicator 1220, and live position indicator 1230. In other implementations, content redistribution server 1200 may include additional, fewer, different, or differently arranged components.

Display area 1205 may be used to present content, such as video content. Although not shown, content redistribution server 1205 (or another portion of content redistribution server 1200) may include controls associated with presenting content, such as play, pause, stop, rewind, fast forward, volume, or other controls. The content may be, for example, redistributed content provided by CRS 310.

Progress bar 1210 may provide information regarding the redistributed content. For example, progress bar 1210 may represent an entire duration, or entire scheduled duration, of the content. For instance, assume that the content is a live broadcast of a sporting event, and is scheduled to be one hour long. Progress bar 1210 may be presented on a scale of one hour, in that one end of progress bar 1210 may represent the zero-minute mark, and the other end of progress bar 1210 may represent the sixty-minute mark.

Current position indicator 1215 may indicate a current temporal position in the content. The current temporal position may correspond to the relative time, in the content, at which the content is being presented in content redistribution server 1205. Digest available indicator 1220 may indicate that digested content is available, and digest duration indicator 1225 may indicate a period of time, in the content, that is associated with the digested. That is, for example, the digested content may include a summary regarding a period of time, as indicated by digest duration indicator 1225, in the content.

Live position indicator 1230 may indicate a "live" position in the content. For example, as mentioned above, the content may correspond to content that is currently being broadcasted (e.g., a live broadcast), and the content may be currently being viewed in a time-shifted manner (e.g., "behind" the live broadcast). Live position indicator 1230 may thus indicate a latest position that is available for the content, such as a temporal position in the content at which the content is presently being broadcasted.

Progress bar 1210 may be used to select a temporal position in the content at which a user may wish to access. For example, if a user wishes to view the digested content, the user may select (e.g., via a touch on a touch screen of user device 305) digest available indicator 1220. Similarly, if a user wishes to view the content live, the user may select live position indicator 1230.

Figure 13:
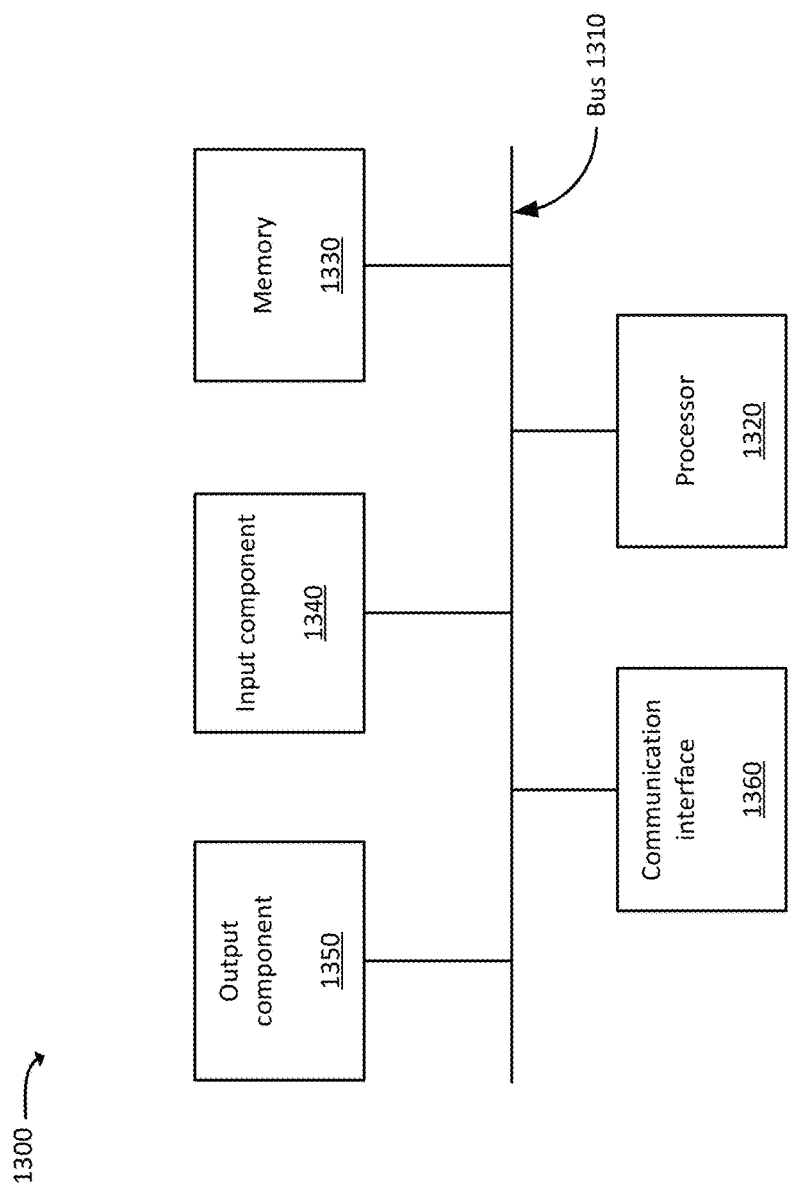
FIG. 13 illustrates example components of one or more devices, according to one or more implementations described herein.

FIG. 13 is a diagram of example components of device 1300. One or more of the devices described above (e.g., as described with respect to FIGS. 1-5 and 8A-8C) may include one or more devices 1300. Device 1300 may include bus 1315, processor 1315, memory 1325, input component 1335, output component 1345, and communication interface 1260. In another implementation, device 1300 may include additional, fewer, different, or differently arranged components.

Bus 1315 may include one or more communication paths that permit communication among the components of device 1300. Processor 1315 may include a processor, microprocessor, or processing logic that may interpret and execute instructions. Memory 1325 may include any type of dynamic storage device that may store information and instructions for execution by processor 1315, and/or any type of non-volatile storage device that may store information for use by processor 1315.

Input component 1335 may include a mechanism that permits an operator to input information to device 1300, such as a keyboard, a keypad, a button, a switch, etc. Output component 1345 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1300 may include more than one communication interface 1360. For instance, device 1300 may include one or more wired interfaces and one or more wireless interfaces.

Device 1300 may perform certain operations relating to one or more processes described above. Device 1300 may perform these operations in response to processor 1315 executing software instructions stored in a computer-readable medium, such as memory 1325. A computer-readable medium may be defined as a non-transitory memory device. A memory device may include space within a single physical memory device or spread across multiple physical memory devices. The software instructions may be read into memory 1325 from another computer-readable medium or from another device. The software instructions stored in memory 1325 may cause processor 1315 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6, 7, and 9-11, the order of the blocks may be modified in other implementations. Further, non-dependent blocks may be performed in parallel.

Furthermore, the above description was presented in the context of broadcasting programming content. In some implementations, similar techniques may be used for programming content that is multicasted (e.g., delivered to multiple recipients without using a broadcasting technique), or delivered in another fashion.

The actual software code or specialized control hardware used to implement a particular embodiment is not limiting of the particular embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 3 and 4), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a memory storing a set of processor-executable instructions; and
   one or more processors configured to execute the processor-executable instructions, wherein executing the processor-executable instructions causes the one or more processors to:
   receive first content that has been distributed via one or more broadcast techniques;
   determine whether the first content includes a first identifier indicating that the first content is redistributed content;
   identify that the first content does not include the first identifier indicating that the first content is redistributed content;
   present the received first content based on identifying that the first content does not include the first identifier indicating that the first content is redistributed content;
   receive second content that has been distributed via the one or more broadcast techniques;
   identify that the second content includes the first identifier indicating that the second content is redistributed content;
   generate a second identifier by performing a hash operation on a portion of the first content;
   generate a third identifier by performing the hash operation on a portion of the second content;
   compare the second identifier to the third identifier to determine that the second and third identifiers match; and
   discard the second content without presenting the second content, based on:
   the identifying that the second content includes the first identifier indicating that the second content is redistributed content, and
   the determination that the second and third identifiers match.

2. The device of claim 1, wherein executing the processor-executable instructions, to discard the second content, further causes the one or more processors to:
   forgo providing, by a layer of the user device that is lower than an application layer of the user device, the second content to the application layer of the user device.

3. The device of claim 1, wherein executing the processor-executable instructions, to receive the first content, further causes the one or more processors to:
   receive the first content via a mobile wireless network, and
   wherein executing the processor-executable instructions, to receive the second content, further causes the one or more processors to:
   receive the second content via a wireless local area network ("WLAN").

4. The device of claim 1, wherein the broadcast technique, by which at least one of the first content or the second content is broadcast, includes at least one of:
   a Multimedia Broadcast Multicast Service ("MBMS") technique,
   an evolved MBMS ("eMBMS") technique, or
   a Cell Broadcast Service ("CBS") technique.

5. The device of claim 1, wherein the second content is a time-shifted and redistributed version of the first content.

6. The device of claim 5, wherein the second server device broadcasts the second content when at least a threshold quantity of user devices have entered a particular area, associated with the second server device, after the first content has begun being broadcast by the first server device.

7. A non-transitory computer-readable medium, storing a set of processor-executable instructions, which, when executed by one or more processors, cause the one or more processors to:
    receive first content that has been distributed via one or more broadcast techniques;
    determine whether the first content includes a first identifier indicating that the first content is redistributed content;
    identify that the first content does not include the first identifier indicating that the first content is redistributed content;
    present the received first content based on identifying that the first content does not include the first identifier indicating that the first content is redistributed content;
    receive second content that has been distributed via the one or more broadcast techniques;
    identify that the second content includes the first identifier indicating that the second content is redistributed content;
    generate a second identifier by performing a hash operation on a portion of the first content;
    generate a third identifier by performing the hash operation on a portion of the second content;
    compare the second identifier to the third identifier to determine that the second and third identifiers match; and
    discard the second content without presenting the second content, based on:
        the identifying that the second content includes the first identifier indicating that the second content is redistributed content, and
        the determination that the second and third identifiers match.

8. The non-transitory computer-readable medium of claim 7, wherein the set of processor-executable instructions further include processor-executable instructions to:
    forgo providing, by a layer of the user device that is lower than an application layer of the user device, the second content to the application layer of the user device.

9. The non-transitory computer-readable medium of claim 7, wherein the set of processor-executable instructions further causes the one or more processors to, when receiving the first content:
    receive the first content via a mobile wireless network, and
    wherein the set of processor-executable instructions further causes the one or more processors to, when receiving the second content, receive the second content via a wireless local area network ("WLAN").

10. The non-transitory computer-readable medium of claim 7, wherein the broadcast technique, by which at least one of the first content or the second content was broadcast, includes at least one of:
    a Multimedia Broadcast Multicast Service ("MBMS") technique,
    an evolved MBMS ("eMBMS") technique, or
    a Cell Broadcast Service ("CBS") technique.

11. The non-transitory computer-readable medium of claim 7, wherein the second content is a time-shifted and redistributed version of the first content.

12. The non-transitory computer-readable medium of claim 11, wherein the second server device broadcasts the second content when at least a threshold quantity of user devices have entered a particular area, associated with the second server device, after the first content has begun being broadcast by the first server device.

13. A method, comprising:
    receiving, by a user device, first content that has been distributed via one or more broadcast techniques;
    determining, by the user device, whether the first content includes a first identifier indicating that the first content is redistributed content;
    identifying, by the user device, that the first content does not include the first identifier indicating that the first content is redistributed content;
    presenting, by the user device, the received first content based on identifying that the first content does not include the first identifier indicating that the first content is redistributed content;
    receiving, by the user device, second content that has been distributed via the one or more broadcast techniques;
    identifying, by the user device, that the second content includes the first identifier indicating that the second content is redistributed content;
    generating, by the user device, a second identifier by performing a hash operation on a portion of the first content;
    generating, by the user device, a third identifier by performing the hash operation on a portion of the second content;
    comparing, by the user device, the second identifier to the third identifier to determine that the second and third identifiers match; and
    discarding, by the user device, the second content without presenting the second content, based on:
        the identifying that the second content includes the first identifier indicating that the second content is redistributed content, and
        the determination that the second and third identifiers match.

14. The method of claim 13, wherein discarding the second content includes:
    forgoing providing, by a layer of the user device that is lower than an application layer of the user device, the second content to the application layer of the user device.

15. The method of claim 13, wherein receiving the first content includes:
    receiving the first content via a mobile wireless network, and
    wherein receiving the second content includes:
        receiving the second content via a wireless local area network ("WLAN").

16. The method of claim 13, wherein the second content is a redistributed version of the first content.

17. The method of claim 16, wherein the second server device broadcasts the second content when at least a threshold quantity of user devices have entered a particular area, associated with the second server device, after the first content has begun being broadcasted by the first server device.

18. The method of claim 13, wherein the broadcast technique, by which at least one of the first content or the second content is broadcast, includes a Multimedia Broadcast Multicast Service ("MBMS") technique.

19. The method of claim 13, wherein the broadcast technique, by which at least one of the first content or the second content is broadcast, includes an evolved MBMS ("eMBMS") technique.

20. The method of claim 13, wherein the broadcast technique, by which at least one of the first content or the second content is broadcast, includes a Cell Broadcast Service ("CBS") technique.

* * * * *